C. L. GRAVES.
MACHINE FOR AUTOMATICALLY MANUFACTURING WELDED WIRE CHAINS.
APPLICATION FILED SEPT. 2, 1909.

987,295.

Patented Mar. 21, 1911.
5 SHEETS—SHEET 1.

WITNESSES:
H. A. Lamb
M. J. Longden

INVENTOR
Chas. L. Graves.
BY
ATTORNEY

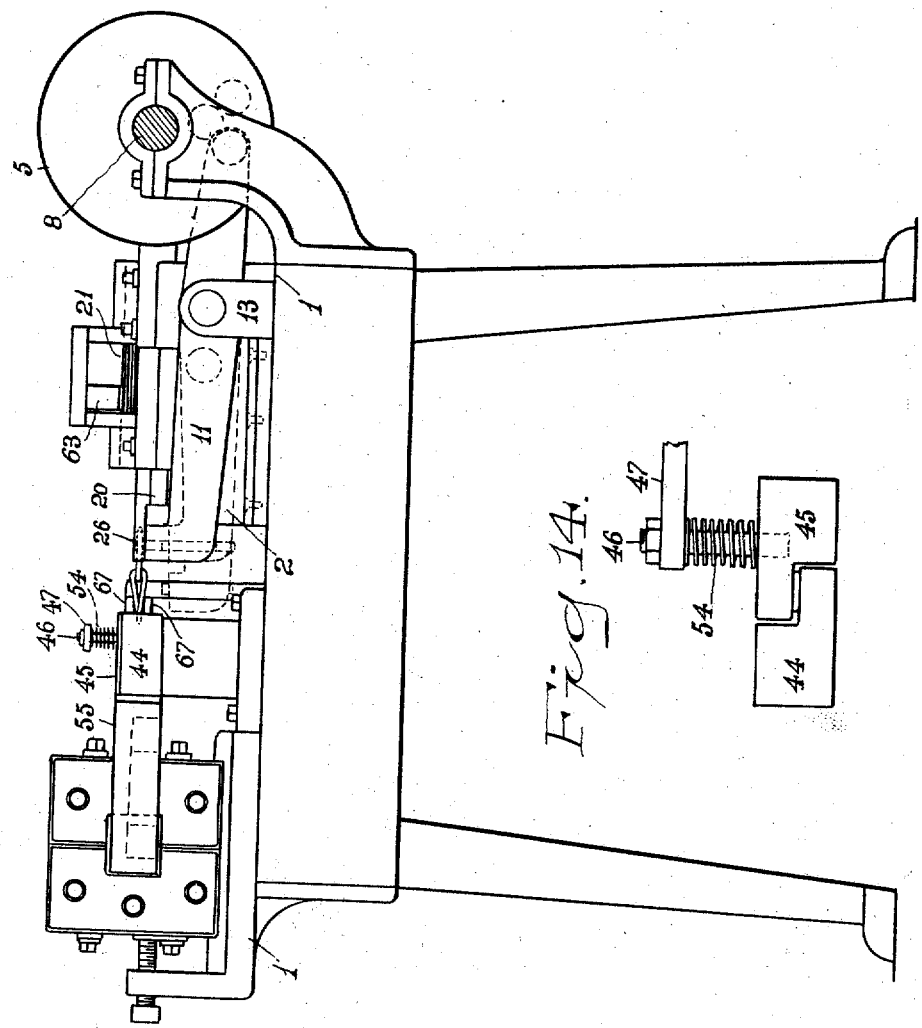

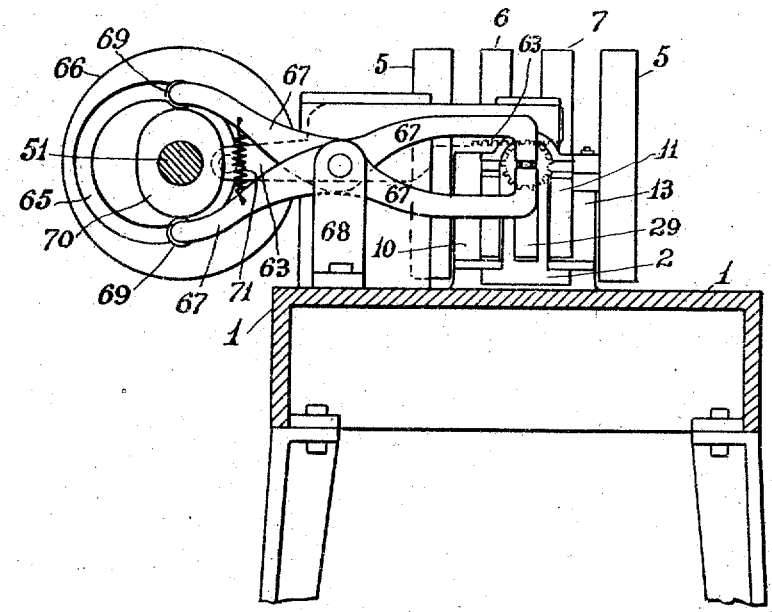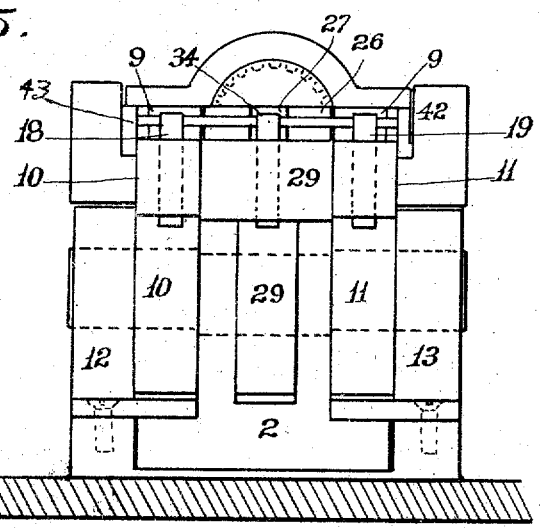

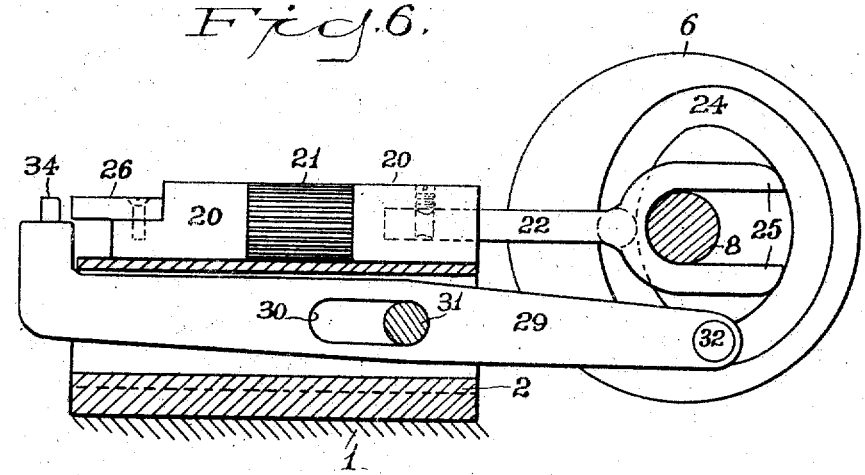
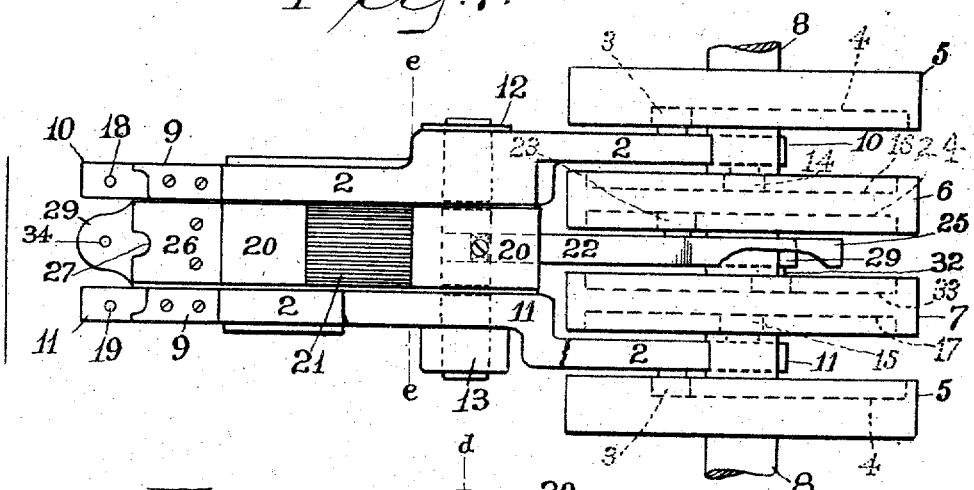
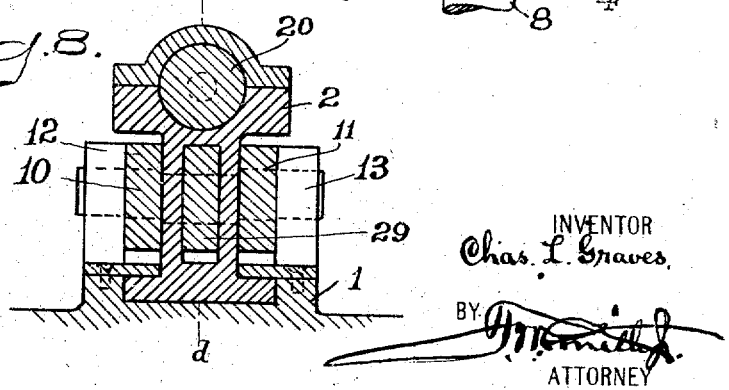

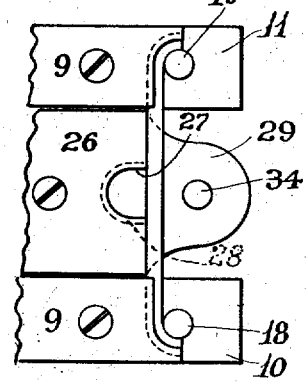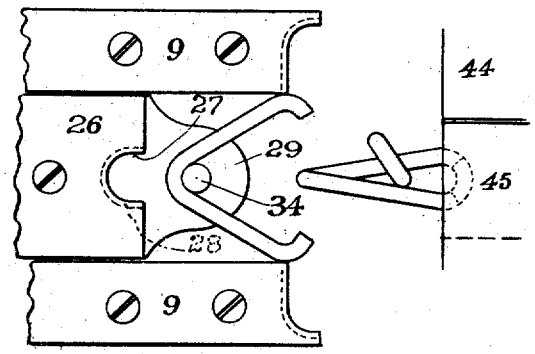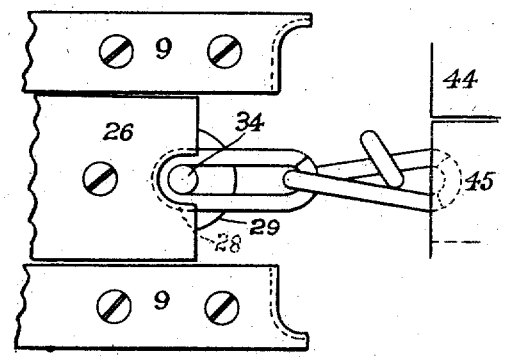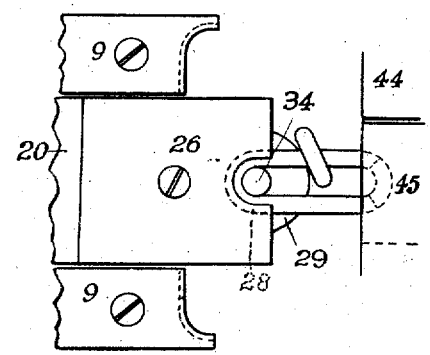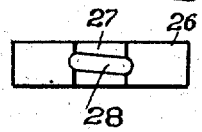

UNITED STATES PATENT OFFICE.

CHARLES L. GRAVES, OF MILFORD, CONNECTICUT, ASSIGNOR, BY MESNE ASSIGNMENTS, TO AUTOMATIC WELDING MACHINE COMPANY, A CORPORATION OF CONNECTICUT.

MACHINE FOR AUTOMATICALLY MANUFACTURING WELDED WIRE CHAINS.

987,295.

Specification of Letters Patent.

Patented Mar. 21, 1911.

Application filed September 2, 1909. Serial No. 515,754.

*To all whom it may concern:*

Be it known that I, CHARLES L. GRAVES, a citizen of the United States, residing at Milford, in the county of New Haven and State of Connecticut, have invented certain new and useful Improvements in Machines for Automatically Manufacturing Welded Wire Chains; and I do hereby declare the following to be a full, clear, and exact description of the invention, such as will enable others skilled in the art to which it appertains to make and use the same.

My invention relates to certain improvements in machines for manufacturing welded wire chains, but more particularly has reference to machines of this description for lap welding the chain links, for imparting a twist to the links and for connecting a partially formed link with a previously welded and twisted link.

The object of my invention is to produce a machine that will automatically perform these operations of welding, twisting and connecting the links of the chain expeditiously and positively, and with this end in view my invention consists in the details of construction and arrangement of parts hereinafter referred to and then particularly pointed out in the claims which conclude this description.

Figure 1:
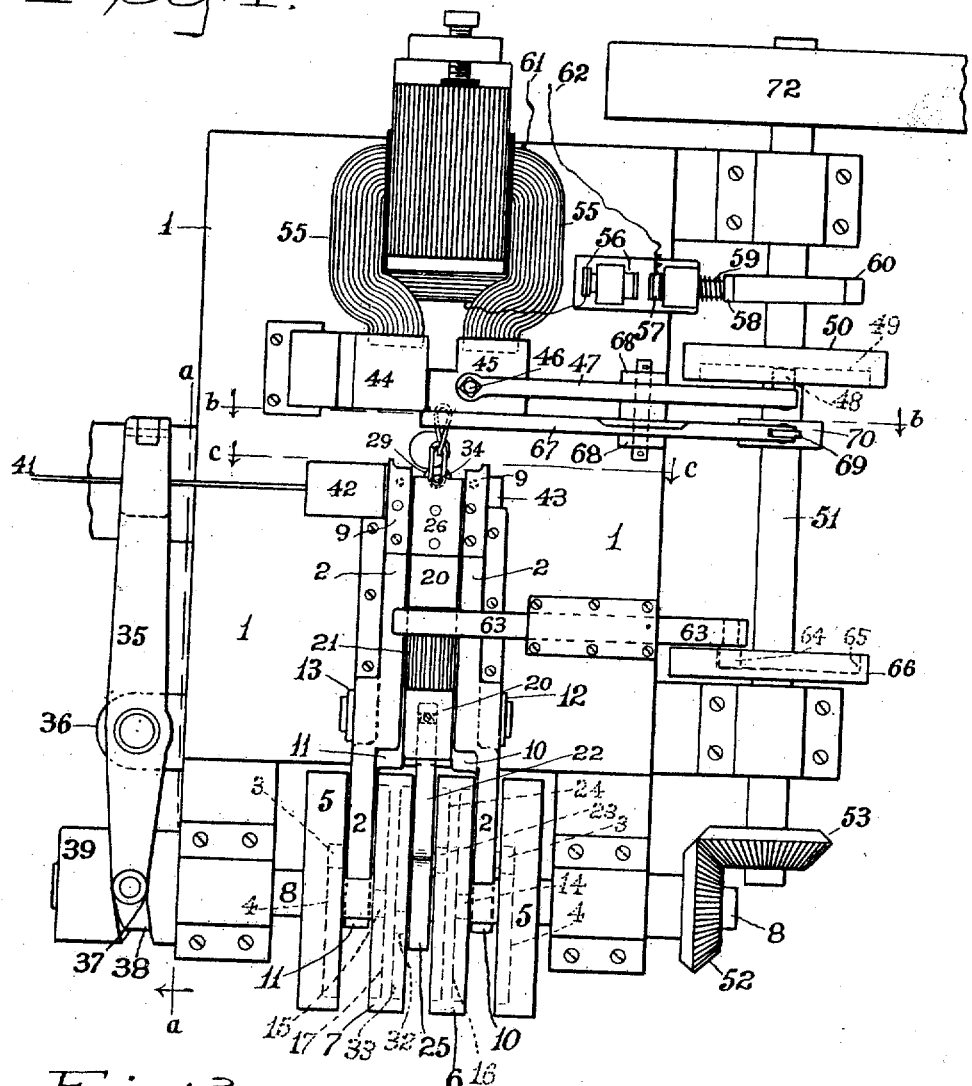
Figure 3:
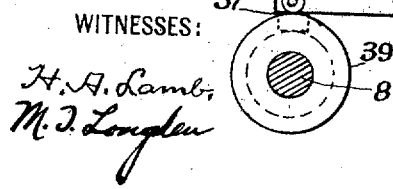

In the accompanying drawing Figure 1 is a plan view of my improved machine—Fig. 2 a side elevation thereof, with the wire feeding devices sectioned away—Fig. 3 a section at the line *a, a,* of Fig. 1—Fig. 4 a section at the line *b, b,* of Fig. 1—Fig. 5 a section at the line *c, c,* of Fig. 1—Fig. 6 a section at the line *d, d,* of Fig. 8—Fig. 7 a detail enlarged plan view of the main slide, the plunger slide and parts connected therewith, the side rock bars and cam connections for operating said slides and bars—Fig. 8 a section at the line *e, e,* of Fig. 7—Figs. 9, 10, 11, and 12, detail broken plan views showing particularly the position of the several instrumentalities immediately associated with the wire in performing the various operations in the formation of the link, connecting a partially formed link, and delivering the link to the welding instrumentalities—Fig. 13 is a detail view of the front edge of the tool which operates to close the ends of a partially formed link and connect the same with a previously formed link, and Fig. 14
is a detail broken elevation of the electrodes and clamping lever.

Similar numerals of reference denote like parts in the several figures of the drawing.

My improvement is not limited to the use of any particular manner of effecting the welding of the overlapping extremities of the links, and therefore any suitable welding process may be employed, but I have illustrated and will describe an electric welding process since I prefer to utilize the same.

My improvement comprises means for feeding the wire and cutting a proper length therefrom, means for forming preliminary hooks on the ends of the wire blank, and for bending the latter into substantially U-shape, means for finally bending and throwing the side wires of the partially completed link toward each other in slightly different horizontal planes so that the hook ends will overlap within a previously completed link, whereby the concatenation of the links is effected while the previously completed link is still held within the welding electrodes, means for retracting the partially completed link whereby the completed link is pulled from the electrodes, means for subsequently advancing the partially completed link and welding the lapped ends together, and means for twisting the rear portion of the link whereby the same will be disposed in substantially a vertical plane preparatory to being connected with a succeeding link, all of which will be readily understood from the following description.

The parts of my improvement which are immediately associated with the wire element in the manufacture of the chain are actuated by means of suitable levers and cams which are very ordinary in their construction and require no detail explanation herein, and therefore I will refer to such levers and cams merely by numerals of reference without any particular description thereof. Also, in some instances I have omitted from the illustrations all cap plates which are used to hold down the parts hereinafter termed the "main slide" and "plunger slide" since said plates would largely conceal said slides and are merely mechanical adjuncts having nothing whatever to do with the invention proper.

1 is the bed of the machine, and 2 is the main slide adapted to reciprocate within suitable ways in said bed, the rear extremities of said slide being equipped with rolls 3 (shown in dotted lines) which engage with cam grooves 4 (shown in dotted lines) in wheels 5, whereby the movements of said slide are effected. The wheels 5 and also the wheels 6, 7, are carried by a shaft 8 journaled in the bed of the machine. Secured to the extreme forward ends of the slide 2 are the preliminary bending tools 9 which operate to form the hooks in the ends of the wire blank preparatory to the formation of a link.

10, 11, are rocking bars pivoted near the sides of the slide 3 to uprights 12, 13, that rise from the bed of the machine, the rear extremities of said bars passing beneath the shaft 8 and provided with rolls 14, 15, (shown in dotted lines) that engage within cam grooves 16, 17, (shown in dotted lines) in the outer faces of the wheels 6, 7, whereby the rocking movements of said bars 10, 11, are effected. The forward extremities of these bars 10, 11, carry vertically disposed pins 18, 19, which coöperate with the tools 9 in forming the preliminary hooks on the ends of a wire blank.

20 is the plunger slide which is capable of independent lengthwise movements within ways in the main slide 2 and rigid with this slide 20 is an elongated pinion 21. Swiveled to the rear end of the slide 20 in any suitable manner is a plunger rod 22 which is equipped with a roll 23 (shown in dotted lines) that engages with a cam groove 24 (shown in dotted lines at Fig. 7 and in solid lines at Fig. 6) in the inside face of the wheel 6, whereby the reciprocations of the slide 20 are effected, and this rod 20 terminates at its rear end in a fork 25 that loosely embraces the shaft 8 and serves to prevent axial displacement of the rod when the slide 20 is rotated in the manner hereinafter to be described.

To the forward extremity of the slide 20 is secured the tool 26 which is cut away as shown at 27 at its forward edge which latter is provided with a slightly inclined but generally horizontally disposed groove 28 (see Fig. 13) this tool 26 operating to grasp the partially formed link and to finally bend the side wires thereof in slightly different horizontal planes so that the hook ends will overlap preparatory to welding.

29 is a rocking lever having near its central portion an elongated slot 30 which lever extends loosely through the slide 2 and is pivoted thereto by means of a pin 31 that extends from the walls of the slide within the slot 30, so that it will be readily understood that this lever is capable of rocking movements, while at the same time the slide 2 may operate within prescribed limits without imparting any sliding movements to said lever. The rear extremity of this lever 29 is equipped with a roll 32 which engages with a cam groove 33 (shown in dotted lines) within the inside face of the wheel 7, whereby vertical rocking movements are imparted to said lever while the latter is also retracted and advanced by means of the cam groove 33 in order to act in harmony with the slide 20 in withdrawing a completed link from the welding electrodes and then forcing within the latter the partially completed link. The forward extremity of this lever 29 carries a vertically disposed pin 34 which coöperates with the tool 26 in effecting the final bending of the link and the uniting of the latter with a previously completed link.

35 is the wire feeding lever which is pivoted to the bracket 26 extending from the bed of the machine and has a reciprocation in a horizontal plane, the rear extremity of said lever being provided with a roll 37 which tracks within a cam groove 38 in a collar 39 that is carried by the shaft 8, whereby the reciprocations of said lever 35 are effected. To the forward extremity of this lever 35 is pivoted a grip lug 40, and the wire 41 is passed between said lug and the under side of said lever, and when the free end of the latter is thrown inwardly the wire will be grasped firmly and fed, while at the return movement of the lever the lug will merely slip along the wire until it arrives at its proper position preparatory to a succeeding feeding operation, this being an old and well known form of wire feed requiring no particular description.

42 is an anvil block secured to the bed of the machine and through which the wire is fed and abuts against a post 43 preparatory to severing a blank from the wire.

The front edge of the tool 9 adjacent to the inner face of the anvil acts as the cutter to sever the blank, the continued movements of the tools 9 bending the extremities of the severed blank around the pins 18, 19, the blank, after it has been severed, being supported upon the rock bars 10, 11, and 29, in the rear of the pins 18, 19, and 34.

44, 45, are the electrodes, the former of which is stationary and is supported on the bed of the machine while the latter is capable of being slightly elevated and lowered so that it may be depressed or elevated toward and away from the stationary electrode for the purpose presently to be explained. The electrode 45 has a vertical pin 46 fixed therein, the upper end of which latter is secured to a lever 47 that is pivoted to the upright 68 rising from the bed of the machine and carries at its rear end a roll 48 (shown in dotted lines) that engages a cam groove 49 (shown in dotted lines) in a wheel 50 that is carried by a shaft 51 journaled to the bed of the machine at right angles to the shaft 8, these shafts 8 and 51 carrying respectively meshing bevel gears 52, 53. Confined between the lever 47 and the electrode 45 is a coil spring 54, as shown more particularly at Fig. 14.

The cam groove in the wheel 50 operates to depress and elevate the free end of the lever 47, the depression of this lever acting to force the electrode 45 downwardly toward the electrode 44 with a yielding pressure due to the interposed spring 54, while the elevation of the lever 47 relaxes the pressure against the electrode 45 and slightly raises this electrode so that the space between the two electrodes is ample to permit of the withdrawal of a welded link and the insertion of a succeeding link. This yielding pressure between the electrodes produces excellent results since a dead pressure during a welding operation does not permit of a proper fusing and distribution of the metal at the point of welding, and a pressure that greatly increases from a minimum to a maximum during the welding operation will result in a thorough and uniform welding.

55 are the electrical conductors extending through and supported by the usual core and connected with the electrodes.

56, 57, are insulated terminals supported in any suitable manner upon the frame of the machine, the terminal 56 being stationary while the terminal 57 is movable and is provided at its rear end with a head 58 which is kept in contact by means of a spring 59 with a cam 60 carried by the shaft 51, said cam operating to force the terminal 57 in contact with the terminal 56, while the spring acts to retract the terminal 57. The current wires 61, 62, are connected respectively with the terminals 56 and 57, and the circuit is closed and opened by the action of this cam 60, and the length of time during which the welding operation is continued depends of course upon the length of time during which the terminals 56, 57, are in contact, and in order to vary this it is merely necessary to change the cam.

63 is a rack bar guided within suitable ways on the bed and engaging the elongated pinion 21, and the rear end of this bar carries a roll 64 (shown in dotted lines) which engages within a cam groove 65 (shown in dotted lines) in a wheel 66 carried by the shaft 51, said cam groove operating to reciprocate the rack bar and thereby revolve the plunger slide 20 for the purpose of twisting the link in the manner and for the purpose hereinafter to be described.

67 are tong levers pivoted to the upright 68 the ends of which levers extend immediately above and below the plane in which the links are delivered between the electrodes, while the rear extremities of these levers are provided with rolls 69 which extend above and below a cam 70 carried by the shaft 51, and the rear portion of these levers are connected by a coil spring 72 whose function is to keep the rolls 69 against the cam 70 and likewise to cause the forward extremities of the levers to separate when allowed to do so by the action of the cam, which latter operates to close the front ends of the levers against a link during the twisting operation.

72 is a power pulley on the shaft 51 whereby the latter as well as the shaft 8 is revolved in order to bring about the action of the parts hereinbefore described.

The operation of my improvement is as follows: After the blank has been severed from the wire, the main slide continues its forward movement until the extremities of this severed blank are bent around the pins 18, 19, so as to form hooks, as shown at Fig. 9, whereupon these pins are lowered by the action of the cam grooves carried by the wheels 6, 7, and the forward movement of the main slide is continued whereby the wire blank is bent into the substantially U-form around the pin 34 as shown at Fig. 10, in which last named figure a previously completed link is shown held between the electrodes; the plunger slide 20 is now advanced by the action of the cam groove in the wheel 6 until the tool 26 has engaged the partially formed link and imparted the final bend thereto so as to engage the hooked portions in lapped condition within the end of the previously completed link, as shown at Fig. 11; the plunger slide and lever 29 are then retracted slightly by the action of the cam grooves within the wheels 6, 7, until the previously completed link has been withdrawn from the electrodes, the circuit having meanwhile been broken and the clamping pressure between the electrodes relaxed, and this previously completed link will then fall by gravity and remain suspended upon the now partially completed link; the plunger slide and lever 29 are now advanced by the action of the cam grooves within the wheels 6, 7, and the unwelded ends of the partially completed link inserted between the electrodes, as shown at Fig. 12, the cam groove 49 within the wheel 50 now operating to depress the forward end of the lever 47 so as to clamp the link within the electrodes, and as soon as this clamping operation begins, the cam grooves in the wheels 6, 7, operate to lower the forward end of the lever 29, so as to withdraw the pin 34 from the link and to retract the plunger slide 20 so as to leave the link isolated in its clamped condition between the electrodes; when the pin 34 and tool 26 have been withdrawn from the link, the cam 60 operates to close the circuit thereby effecting the welding of the ends of the link, and as soon as the circuit is broken the cam groove in the wheel 6 operates to advance the plunger slide until the tool 26 again grasps the free end of the link and the tong levers 67 are now clamped against the link by the action of the cam 70, whereupon the cam groove in the wheel 66 operates to slide the rack bar thereby revolving the plunger slide through an angle of 90° and twisting the free end of the link into the position shown at Fig. 10, preparatory to the connecting therewith of a successive link. The various cams now operate to return the several parts to normal position the tong levers 67 exerting a final squeezing action against the welded ends as they are withdrawn from the electrodes thereby shaping and finishing these ends, and the several operations just described are then repeated.

Having thus described my invention what I claim as new and desire to secure by Letters Patent is:—

1. In a machine for automatically manufacturing welded wire chains, the combination of means for holding a completed link in position to receive a succeeding link, means for forming hooks on the ends of a blank for a succeeding link, means for forming said succeeding link into substantially U-shape with said hook ends extending inwardly and on opposite sides of the previously completed link, means for passing the hooked ends of a succeeding partially formed link through a previously completed link and bringing the ends together, suitable welding devices, and means for delivering the ends of the partially completed link to such welding devices.

2. In a machine for manufacturing welded wire chains, the combination of means for holding a previously completed link in position to receive a succeeding link, means for severing the wire blank and bending the latter into substantially U-shape, means for forming hooks at the ends thereof, and means for finally bending the link with the ends together and connecting the same with a previously completed link, with means for welding the ends of the partially completed link, and means for twisting the link.

3. In a machine for manufacturing welded wire chain, the combination of automatically operated instrumentalities for holding a previously completed link in position to receive a succeeding partially formed link, with means for bending a blank for a succeeding link into substantially U-shape, means for forming hooks at the ends thereof which hooks extend on opposite sides of a previously completed link, means for closing the link thus partially formed through the previously completed link with the hooked ends together whereby a succeeding link is connected with the previously completed link, and means for welding said ends.

4. In a machine for automatically manufacturing welded wire chains, the combination with means for holding a previously completed link in position to receive a succeeding link, of means for initially forming hooks at the ends of a wire blank and subsequently bending the latter into substantially U-shape, means for finally bending the link thus partially formed with its ends together within said previously completed link, and means for welding together said ends.

5. In a machine for automatically manufacturing welded wire chains, the combination of means for welding the ends of the links, means for twisting previously welded links into substantially a vertical plane and means for holding the twisted links in said plane in position to receive succeeding links, with means for forming hooks on the ends of the blanks for succeeding links, means for bending said blanks into U-shape, and means for uniting succeeding links thus partially formed with previously completed links by passing the hooked ends of succeeding links through the completed links and in abutting position.

6. In a machine for automatically manufacturing welded wire chains, the combination of means for holding a previously completed link in position to receive the ends of a succeeding link, means for initially forming the ends of a suitable blank into hooks and means for subsequently bending the blank into U-shape with the hooks extending on opposite sides of a previously completed link, with means for closing the hooked ends of the partially formed link together through the previously completed link whereby the links are united, suitable welding devices, and means for delivering the ends of a previously completed link to said welding devices.

7. In a machine for making wire chain, the combination of means for holding a completed link in position to receive the ends of a partially formed link, means for passing the ends of the partially formed link through said completed link, suitable welding devices, and means for delivering the ends of the partially completed link to such devices.

8. In a machine for automatically manufacturing welded wire chains, the combination of means for holding a completed link in position to receive a succeeding link, means for forming hooks on the ends of a blank for a succeeding link, means for forming said succeeding link into substantially U-shape with said hook ends extending inwardly and on opposite sides of the previously completed link, means for passing the hooked ends of a succeeding partially formed link through a previously completed link and in lapped condition, suitable welding devices, and means for delivering the lapped ends of the partially completed link to such welding devices.

9. In a machine for manufacturing welded wire chains, the combination of means for holding a previously completed link in position to receive a succeeding link, means for severing the wire blank and bending the latter into substantially U-shape, means for forming hooks at the ends thereof, and means for finally bending the link with the ends overlapped and connecting the same with a previously completed link, with means for welding the lapped ends of the partially completed link, and means for twisting the link.

10. In a machine for manufacturing welded wire chain, the combination of automatically operated instrumentalities for holding a previously completed link in position to receive a succeeding partially completed link, with means for bending a blank for a succeeding link into substantially U-shape, means for forming hooks at the ends thereof which hooks extend on opposite sides of a previously completed link, means for closing the link thus partially formed through the previously completed link with the hooked ends overlapping whereby a succeeding link is connected with a previously completed link, and means for welding said overlapped ends.

11. In a machine for automatically manufacturing welded wire chains, the combination with means for holding a previously completed link in position to receive a succeeding link, of means for initially forming hooks at the ends of a wire blank and subsequently bending the latter into substantially U-shape, means for finally bending the link thus partially formed with its ends overlapping within said previously completed link, and means for welding together said overlapping ends.

12. In a machine for automatically manufacturing welded wire chains, the combination of means for welding the ends of the links, means for twisting previously welded links into substantially a vertical plane and means for holding the twisted links in said plane in position to receive succeeding links, with means for forming hooks on the ends of the blanks for succeeding links, means for bending said blanks into U-shape, and means for uniting succeeding links thus partially formed with previously completed links by passing the hooked ends of succeeding links through the completed links and in lapped position.

13. In a machine for automatically manufacturing welded wire chains, the combination of means for holding a previously completed link in position to receive the ends of a succeeding link, means for initially forming the ends of a suitable blank into hooks and means for subsequently bending the blank into U-shape with the hooks extending on opposite sides of a previously completed link, with means for closing the hooked ends of the partially formed link in overlapped position through the previously completed link whereby the links are united, suitable welding devices, and means for delivering the overlapped end of a previously completed link to said welding devices.

14. In a chain-making machine, the combination of mechanism for turning over the ends of a straight blank, mechanism for holding a link previously formed in proper relation to the blank to receive the ends of the latter as it is bent into the form of a link, mechanism for bending the blank into the form of a link and passing its ends through the link previously formed, and means for operating said mechanisms in the sequence described.

15. In a chain-making machine, the combination with welding jaws, of mechanism for forming a link from a straight blank, twisting it and then inserting it between the welding jaws, and means for operating said mechanisms in the sequence described.

16. In a chain-making machine, the combination with a suitable frame, of mechanism for turning over the ends of a suitable blank, mechanism for forming the link and closing its ends together, means for holding the newly formed link in position to receive the ends of the link next formed during the operation of forming and closing the latter, mechanism for twisting the link into position to receive the next link while held by said holding means, and means for operating said mechanisms in the sequence described.

17. In a chain-making machine, the combination with a suitable frame, of welding jaws arranged to reciprocate for the purpose of receiving and closing upon the ends of a newly formed link, a reciprocable plunger adapted to bend the blank around a form block interposed in its line of travel, and then to deliver it to the jaws, a reciprocable form-block whose line of movement is angular to that of the plunger, and means for operating said parts in a cycle of operations, whereby the blank is bent by the plunger around the form-block, said block is withdrawn, and the newly formed link is delivered to the jaws to be welded.

18. In a chain-making machine, the combination of a reciprocable form-block, welding jaws arranged to reciprocate for the purpose of receiving and closing upon the ends of a newly formed link, a reciprocable plunger adapted to bend the blank around the form block interposed in its line of travel, and then to deliver it to the jaws, and also adapted to rock upon its axis, means for holding the open ends of said newly formed link during such rocking movement, and means for operating said parts in a cycle of operations, whereby the blank is bent by the plunger around the form-block, said block is withdrawn, the newly formed link is twisted and then delivered to the jaws to be welded.

19. In a chain-making machine, the combination of welding jaws, a plunger, an abutment located between the welding jaws and the plunger, and means for moving the plunger toward the welding jaws to cause it to bend a blank about the abutment and then to advance the blank into engagement with the welding jaws.

20. In a chain-making machine, the combination of welding jaws, a plunger, an abutment located between the welding jaws and the plunger, means for advancing the plunger to cause it to bend a blank about the abutment and there to advance the blank into engagement with the welding jaws, means for withdrawing the abutment from the blank after the blank has been bent about it, and means for closing the welding jaws upon the blank after the blank has been inserted therein.

In testimony whereof I affix my signature in presence of two witnesses.

CHARLES L. GRAVES.

Witnesses:
F. W. SMITH, Jr.,
M. T. LONGDEN.